(12) United States Patent
Waki et al.

(10) Patent No.: US 9,422,017 B2
(45) Date of Patent: Aug. 23, 2016

(54) OVERHEAD CONVEYOR APPARATUS

(71) Applicant: Tsubakimoto Chain Co., Osaka-shi, Osaka (JP)

(72) Inventors: Tatsunori Waki, Ikeda (JP); Hiroaki Hamada, Osaka (JP)

(73) Assignee: TSUBAKIMOTO CHAIN CO., Osaka-Shi, Osaka (JP)

( * ) Notice: Subject to any disclaimer, the term of this patent is extended or adjusted under 35 U.S.C. 154(b) by 0 days.

(21) Appl. No.: 14/946,283

(22) Filed: Nov. 19, 2015

(65) Prior Publication Data

US 2016/0144910 A1    May 26, 2016

(30) Foreign Application Priority Data

Nov. 20, 2014   (JP) .................................. 2014-235533

(51) Int. Cl.
| | | |
|---|---|---|
| *B65G 47/60* | (2006.01) | |
| *B65G 21/22* | (2006.01) | |
| *B65G 47/22* | (2006.01) | |
| *B62D 65/18* | (2006.01) | |

(52) U.S. Cl.
CPC ..................................... *B62D 65/18* (2013.01)

(58) Field of Classification Search
CPC .... B65G 47/60; B65G 47/643; B65G 21/22; B65G 37/005; B65G 47/22
USPC ......... 198/343.1, 345.3, 346.1, 346.2, 346.3, 198/347.1, 465.1, 580; 414/927, 928, 929
See application file for complete search history.

(56) References Cited

U.S. PATENT DOCUMENTS

| | | | | |
|---|---|---|---|---|
| 5,465,827 A * | 11/1995 | Nakagawa | ............. | B65G 35/06 104/168 |
| 5,577,597 A * | 11/1996 | Kakida | ................. | B65G 37/02 198/346.2 |
| 5,922,230 A * | 7/1999 | Yokota | .................. | B23K 1/008 198/465.3 |
| 6,008,476 A * | 12/1999 | Neiconi | ............... | B23K 37/047 198/465.3 |
| 6,236,021 B1 * | 5/2001 | Fair | ......................... | C03B 29/08 219/388 |
| 6,752,258 B2 * | 6/2004 | Ludwig | ................. | B65G 35/06 198/463.1 |
| 6,769,536 B2 * | 8/2004 | Lutz | ....................... | B65G 21/06 198/465.1 |
| 6,814,221 B2 * | 11/2004 | Goussev | ............... | B65G 35/08 198/435 |
| 7,275,635 B2 * | 10/2007 | Enya | ..................... | B65G 37/02 198/463.2 |
| 7,547,183 B2 * | 6/2009 | Boettcher | ............ | B65G 63/025 414/789.9 |
| 7,748,514 B2 * | 7/2010 | Shimizu | ................. | B65G 47/46 198/346.1 |
| 7,871,232 B2 * | 1/2011 | Lutz | ..................... | B65G 1/0492 198/463.3 |
| 8,528,717 B2 * | 9/2013 | Ando | .................... | B41F 17/005 198/306 |
| 8,997,969 B2 * | 4/2015 | Plakolm | ................ | B23Q 7/005 198/346.2 |
| 9,022,204 B2 * | 5/2015 | Wang | .................... | B65G 47/643 198/435 |

FOREIGN PATENT DOCUMENTS

| | | |
|---|---|---|
| JP | 02-198749 A | 8/1990 |
| JP | 2792072 B | 8/1998 |

* cited by examiner

*Primary Examiner* — Douglas Hess
(74) *Attorney, Agent, or Firm* — Buchanan Ingersoll & Rooney PC

(57) ABSTRACT

An overhead conveyor apparatus includes: a holding unit configured to hold a work; a transport path configured to transport the holding unit holding the work downstream; and a return path provided above the transport path and configured to return the empty holding unit upstream. The overhead conveyor apparatus may further include: a first lift unit provided upstream of the transport path and configured to lower the holding unit to transfer the holding unit from the return path to the transport path; and a second lift unit provided downstream of the transport path and configured to raise the holding unit to transfer the holding unit from the transport path to the return path.

6 Claims, 3 Drawing Sheets

OVERHEAD CONVEYOR APPARATUS

CROSS-REFERENCE TO RELATED APPLICATION

This application claims priority from Japanese Patent Application No. 2014-235533 filed with the Japan Patent Office on Nov. 20, 2014, the entire content of which is hereby incorporated by reference.

BACKGROUND

1. Technical Field

An embodiment of the present disclosure relates to an overhead conveyor apparatus.

2. Description of the Related Art

For example, in an automobile assembly plant, various components (such as an engine unit and an axle unit) are assembled from below to a car body (work) held and transported at a predetermined height. An overhead conveyor apparatus is known as a transport apparatus that holds and transports car bodies at a predetermined height.

An overhead conveyor apparatus disclosed in, for example, JP-A-02-198749 includes a closed-loop shaped transport rail provided at a predetermined height, and a dolly that can move along the transport rail.

SUMMARY

An overhead conveyor apparatus includes: a holding unit configured to hold a work; a transport path configured to transport the holding unit holding the work downstream; and a return path provided above the transport path and configured to return the empty holding unit upstream.

DESCRIPTION OF THE EMBODIMENTS

Figure 1:
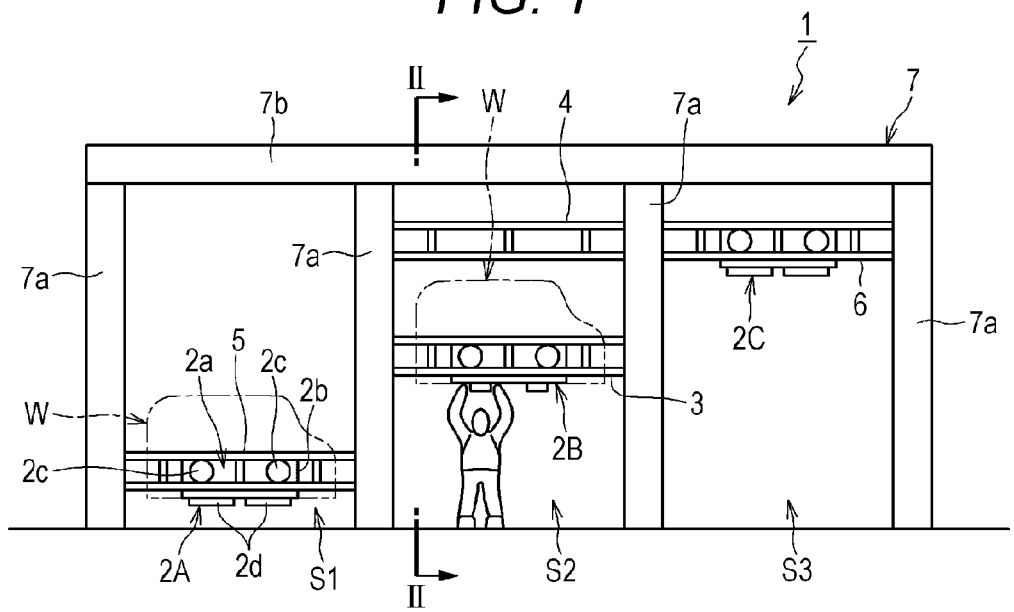
FIG. 1 is a side view of an overhead conveyor apparatus according to one embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

In the above overhead conveyor apparatus, an outbound path (a part where a dolly holding a work is transported downstream) and an inbound path (a part where an empty dolly is returned upstream) of a closed-loop shaped transport rail are placed and arranged in a horizontal direction. In this case, a large space is secured for the transport rail, the dolly to be transported along the transport rail, and the work. Accordingly, the installation space of the overhead conveyor apparatus is increased (especially in the horizontal direction).

One object of an embodiment of the present disclosure is to reduce the installation space of the overhead conveyor apparatus.

An overhead conveyor apparatus according to one aspect of the present disclosure (the overhead conveyor apparatus) includes: a holding unit configured to hold a work; a transport path configured to transport the holding unit holding the work downstream; and a return path provided above the transport path and configured to return the empty holding unit upstream.

It is noted that "upstream" and "downstream" indicate upstream (on the previous step side) and downstream (on the next step side) in a transport direction of the work to be transported by the overhead conveyor apparatus (the same shall apply hereinafter).

In this manner, in the overhead conveyor apparatus, the transport path for transporting the holding unit downstream and the return path for returning the holding unit upstream are placed one over another in the vertical direction. Consequently, the space in the horizontal direction (for example, the transport direction) to provide the transport path and the return path can be reduced.

The overhead conveyor apparatus may further include, for example, a first lift unit provided upstream of the transport path and configured to lower the holding unit to transfer the holding unit from the return path to the transport path, and a second lift unit provided downstream of the transport path and configured to raise the holding unit to transfer the holding unit from the transport path to the return path.

When the overhead conveyor apparatus transports the work, the work carried in from the previous step is usually raised up to the transport path at a predetermined height. Furthermore, the work to which components have been assembled is lowered from the transport path at the predetermined height to carry out the work to the next step. In relation to this, providing lift units for raising the work up to the transport path from a carrying-in position (for example, a floor surface), and lowering the work down to a carrying-out position (for example, the floor surface) from the transport path separately invites increases in complexity and cost of the apparatus.

Thus, it is preferable in the overhead conveyor apparatus to cause the first lift unit to raise the work carried in from the previous step up to the transport path, and also cause the second lift unit to lower the work from the transport path to carry out the work to the next step. In this manner, the common lift unit (the first lift unit) performs the operation of raising the work carried in from the previous step up to the transport path, and the operation of lowering the holding unit down to the transport path from the return path. Accordingly, the simplification and cost reduction of the apparatus can be promoted. Similarly, the common lift unit (the second lift unit) performs the operation of lowering the work down to the carrying-out position to the next step from the transport path, and the operation of raising the holding unit up to the return path from the transport path. Accordingly the simplification and cost reduction of the apparatus can be promoted.

When components are assembled to the work on the transport path in the overhead conveyor apparatus, a load caused by the assembly work may be generally added to the transport path. This may make the support of the work unstable. Therefore, the overhead conveyor apparatus may include a frame body having a plurality of columns that is fixed to the floor surface and extends in a vertical direction, and a beam laid between the plurality of columns. In this case, the transport path may be fixed to the frame body. Consequently, the stiffness of the transport path is increased. As a result, it is possible to hold the work stably also when the above load is added to the transport path.

As described above, according to one aspect of the present disclosure, the installation space of the overhead conveyor apparatus can be reduced.

FIG. 1 illustrates an overhead conveyor apparatus 1 according to one embodiment of the present disclosure. The overhead conveyor apparatus 1 holds and transports a car body W as a work at a predetermined height. The overhead conveyor apparatus 1 mainly includes holding units 2 (2A, 2B and 2C) that hold the car body W, transport rails 3, return rails 4, first lift rails 5, and second lift rails 6. The transport rails 3 are a transport path for transporting the holding unit 2 downstream. The return rails 4 are a return path for returning the holding unit 2 upstream. The first lift rails 5 are provided upstream of the transport rails 3 and the return rails 4. The first lift rails 5 are a first lift unit that raises and lowers the holding unit 2. The second lift rails 6 are provided downstream of the transport rails 3 and the return rails 4. The second lift rails 6 are a second lift unit that raises and lowers the holding unit 2. In the following description, the horizontal direction (a left-and-right direction of FIG. 2) orthogonal to the transport direction (a left-and-right direction of FIG. 1) of the car body W is referred to as the "width direction."

The overhead conveyor apparatus 1 includes a carrying-in area S1, a work area S2, and a carrying-out area S3. The car body W is carried into the carrying-in area S1 from the previous step. Components are assembled to the car body W in the work area S2. The car body W to which the components have been assembled is carried out to the next step in the carrying-out area S3. The overhead conveyor apparatus 1 of the embodiment includes a frame body 7 as a whole forming a substantially cuboid. The frame body 7 includes a plurality of columns 7a extending in the vertical direction, and a beam 7b that is laid over upper ends of the plurality of columns 7a, and extends in, for example, the horizontal direction. The columns 7a are fixed to, for example, the floor surface. In the illustrated example, a pair of columns 7a separated from each other in the width direction is provided in an upright position at each of four locations separated in the transport direction. These columns 7a partition the space in the frame body 7 into three areas along the transport direction. The space on the carrying-in side (the left side in FIG. 1) is the carrying-in area S1. The middle space is the work area S2. The space on the carrying-out side (the right side in FIG. 1) is the carrying-out area S3.

In the embodiment, the overhead conveyor apparatus 1 includes a plurality of (in the embodiment, three) the holding units 2. In the examples illustrated in FIGS. 1 and 4 to 6, the reference numerals 2A, 2B, and 2C are assigned to the respective three holding units. The holding units 2A, 2B, and 2C are driven separately. The holding units 2A, 2B, and 2C have a configuration similar to each other.

Figure 2:
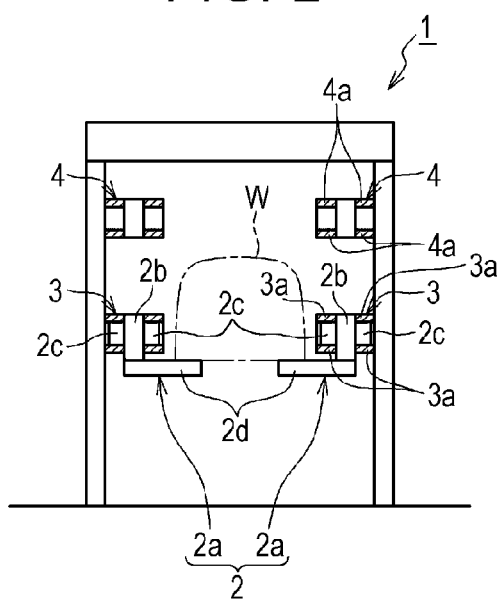
FIG. 2 is a cross-sectional view of the overhead conveyor apparatus, taken along line II-II illustrated in FIG. 1.

The holding units 2 (2A, 2B, and 2C) each include a pair of dollies 2a provided in such a manner as to be separated from each other in the width direction as illustrated in FIG. 2. The pair of dollies 2a supports one car body W from below. The dolly 2a of the holding unit 2 includes a main unit 2b, and rollers 2c and a support arm 2d, which are attached to the main unit 2b. The roller 2c of the dolly 2a is rotatable about a rotation shaft in the width direction, and rolls along the rails 3 to 6. In the illustrated examples, the rollers 2c are provided on both sides in the width direction of the main unit 2b.

Figure 3:
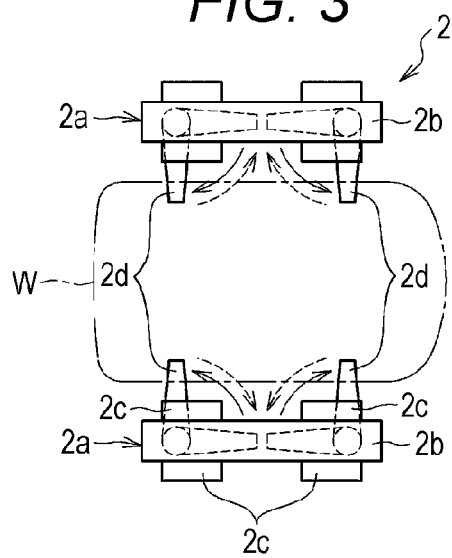
FIG. 3 is a plan view of a holding unit of the overhead conveyor apparatus.

The support arm 2d of the dolly 2a supports the car body W from below. The support arm 2d protrudes inward in the width direction from the main unit 2b. The support arm 2d of the embodiment protrudes inward in the width direction from the main unit 2b as illustrated in FIG. 3. The support arm 2d can move between a position where the support arm 2d can support the car body W (a support position) and a position where the support arm 2d is retracted to avoid the interference of the car body W (a retracted position). Specifically, the support arm 2d can rotate about, for example, a rotation shaft extending in the up-and-down direction. The support arm 2d is made movable between the support position protruding inward in the width direction from the main unit 2b and the retracted position accommodated below the main unit 2b (see arrows in FIG. 3). For example, the direction in which the rotation shaft of the support arm 2d extends may instead be a direction different from the up-and-down direction (for example, the transport direction). Alternatively, the support arm 2d may be a pin that can appear in the width direction (for example, a piston rod of a cylinder). Alternatively, as long as there is no problem in the interference of the car body W, the support arm 2d may be fixed in a state of protruding inward from the main unit 2b.

The transport rail 3 extends linearly in the transport direction. The transport rail 3 is laid between a pair of columns 7a provided in an upright position at both ends in the transport direction in the work area S2. The transport rail 3 is fixed to the pair of columns 7a (see FIG. 1). The return rail 4 extends linearly in the transport direction. The return rail 4 is provided above the transport rail 3, laid between the pair of columns 7a, and fixed to the pair of columns 7a. The transport rail 3 and the return rail 4 also function as beams that reinforce the stiffness of the pair of columns 7a. A pair of the transport rails 3 is provided in such a manner as to be separated from each other in the width direction (see FIG. 2). A pair of the return rails 4 is also provided in such a manner as to be separated from each other in the width direction. Consequently, the transport rails 3 and the return rails 4 support the pair of dollies 2a included in the holding unit 2 (2B). Each transport rail 3 includes four rails 3a that hold, from above and below, the rollers 2c provided on both sides of the main unit 2b in the width direction. The return rail 4 also includes four rails 4a that hold the rollers 2c from above and below.

The first lift rail 5 extends linearly in the transport direction. The first lift rail 5 is raised and lowered along the vertical direction by an unillustrated drive unit. In the illustrated examples, the first lift rail 5 is laid between a pair of columns 7a provided in an upright position at both ends in the transport direction in the carrying-in area S1. The first lift rail 5 in the illustrated examples includes four rails that hold the rollers 2c provided on both sides of the main unit 2b in the width direction, from above and below (illustration omitted) as in the transport rail 3 and the return rail 4. The first lift rail 5 can ascend and descend between a height at which the car body W carried into the carrying-in area S1 from the previous step can be received (a carrying-in height, see FIG. 1), the same height as the transport rail 3 (see FIG. 4), and the same height as the return rail 4 (see FIGS. 5 and 6). When the first lift rail 5 is placed at the same height as the transport rail 3 or the return rail 4, the first lift rail 5, and the transport rail 3 or the return rail 4 are placed on the same straight line. Thus, the dolly 2a can be transferred between these rails.

The second lift rail 6 extends linearly in the transport direction. The second lift rail 6 is raised and lowered along the vertical direction by an unillustrated drive unit. In the illustrated examples, the second lift rail 6 is laid between a pair of columns 7a provided in an upright position at both ends in the transport direction in the carrying-out area S3. The second lift rail 6 in the illustrated examples includes four rails that hold the rollers 2c provided on both sides of the main unit 2b in the width direction, from above and below (illustration omitted) as in the transport rail 3 and the return rail 4. The second lift rail 6 can ascend and descend between a height at which the car body W can be carried out to the next step (a carrying-out height, see FIG. 6), the same height as the transport rail 3 (see FIGS. 4 and 5), and the same height as the return rail 4 (see FIG. 1). When the second lift rail 6 is placed at the same height as the transport rail 3 or the return rail 4, the second lift rail 6, and the transport rail 3 or the return rail 4 are placed on the same straight line. Thus, the dolly 2a can be transferred between these rails.

A procedure for transporting the car body W by the above overhead conveyor apparatus 1 is described below.

Figure 4:
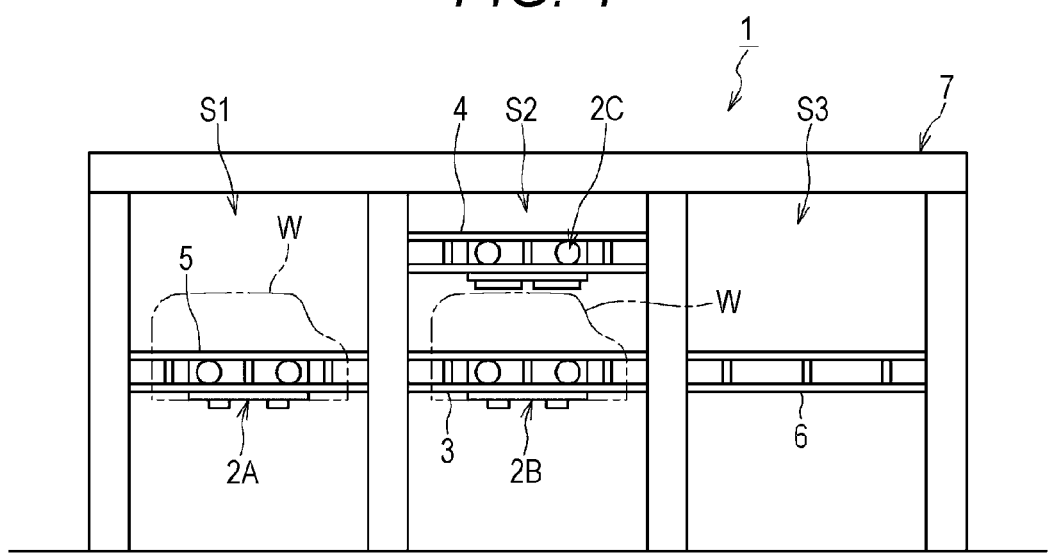
FIG. 4 is a side view illustrating a procedure for transporting a car body by the overhead conveyor apparatus.

Firstly, in the state illustrated in FIG. 1, the holding units 2A, 2B, and 2C are respectively placed in the carrying-in area S1, the work area S2, and the carrying-out area S3. In the carrying-in area S1, the first lift rails 5 and the holding unit 2A are placed at the carrying-in position (lower end position), the work of transferring the car body W carried in from the previous step onto the holding unit 2A is performed. Specifically, for example, the car body W mounted on a carrying-in dolly (illustration omitted) carried by hand pushed by an operator is carried into the carrying-in area S1. After the car body W is placed between a pair of the first lift rails 5, the support arms 2d of the pair of dollies 2a of the holding unit 2A held by the first lift rails 5 are rotated and caused to protrude inward in the width direction (see the solid arrows in FIG. 3). The first lift rails 5 are raised in this state. Accordingly, the support arms 2d of the holding unit 2A lift the car body W. As illustrated in FIG. 4, when the first lift rails 5 are placed at the same height as the transport rails 3, the first lift rails 5 are stopped moving.

Meanwhile, in the work area S2, the operator assembles components (such as an engine unit and an axle unit) to the car body W held by the holding unit 2B, from below (see FIG. 1). The transport rails 3 that support the car body W and the holding unit 2B are fixed to the frame body 7. The frame body 7 is configured assembling the columns 7a and the beam 7b into a substantially cuboid, and reinforced with the transport rails 3 and the return rails 4. Therefore, the frame body 7 has high stiffness. Hence, the car body W is supported stably. Accordingly, the work of assembling components is facilitated.

Moreover, meanwhile, the second lift rails 6 supporting the holding unit 2C are placed at the same height as the return rails 4 in the carrying-out area S3 (see FIG. 1). The holding unit 2C is then returned upstream to be transferred onto the return rails 4. The second lift rails 6 are subsequently lowered to be placed at the same height as the transport rails 3 (see FIG. 4).

Figure 5:
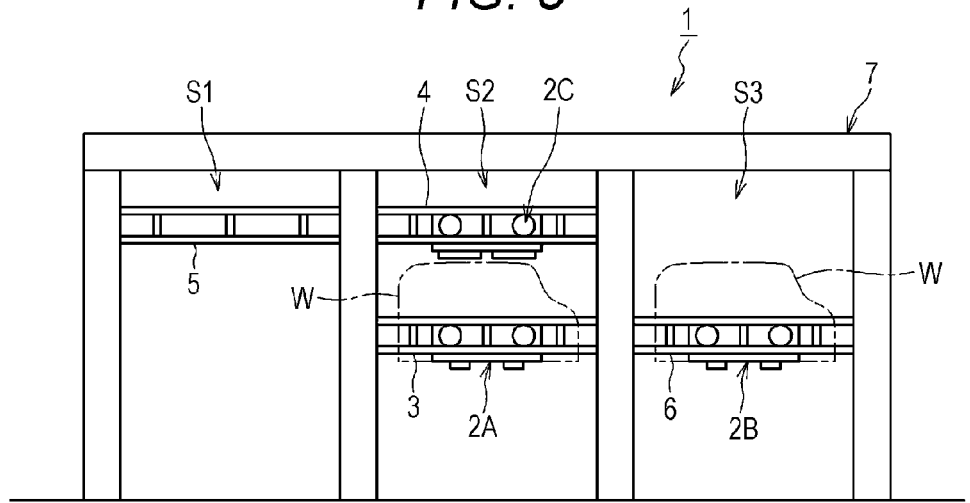
FIG. 5 is a side view illustrating the procedure for transporting the car body by the overhead conveyor apparatus.

After the assembly of the components to the car body W is complete in the work area S2, the holding unit 2B holding the car body W is carried out downstream as illustrated in FIG. 5. In other words, the holding unit 2B is transferred from the transport rails 3 in the work area S2 onto the second lift rails 6 in the carrying-out area S3. At the same time, or after this, the car body W held by the holding unit 2A in the carrying-in area S1 before component assembly is carried out downstream. In other words, the car body W held by the holding unit 2A before component assembly is transferred from the first lift rails 5 in the carrying-in area S1 onto the transport rails 3 in the work area S2. After the holding unit 2A and the car body W are carried out from the first lift rails 5, the first lift rails 5 are raised to be placed at the same height as the return rails 4.

Figure 6:
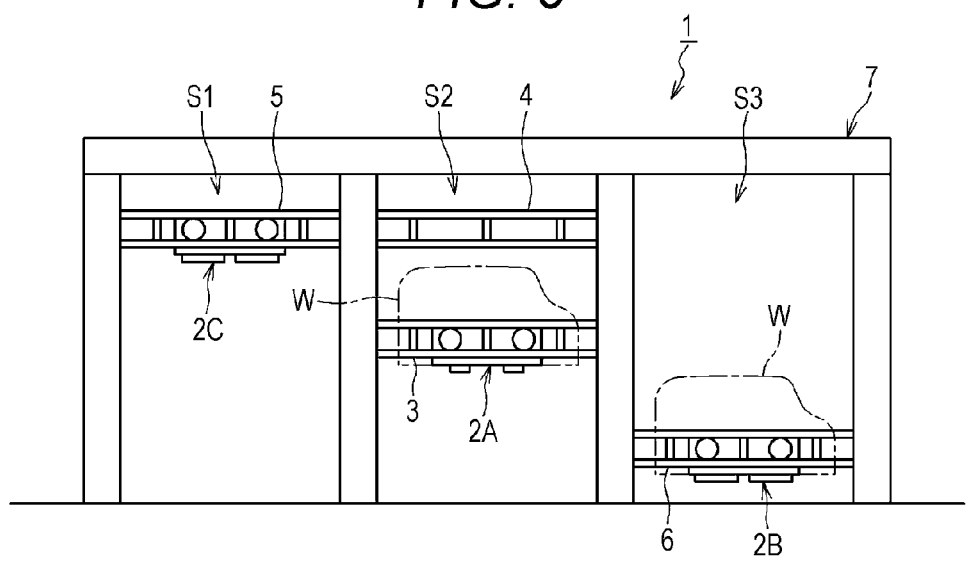
FIG. 6 is a side view illustrating the procedure for transporting the car body by the overhead conveyor apparatus.

Next, as illustrated in FIG. 6, the second lift rails 6, the holding unit 2B, and the car body W in the carrying-out area S3 are lowered down to the carrying-out position (lower end position). Furthermore, the car body W is mounted on an unillustrated carrying-out dolly. The support arms 2d of the holding unit 2B are subsequently rotated to be retracted from below the car body W (see the dotted arrows in FIG. 3). The car body W to which the components have been assembled is then carried out to the next step by the carrying-out dolly. The holding unit 2B that has been emptied is subsequently raised by the second lift rails 6, and stopped at the same height as the return rails 4 (see FIG. 1).

Meanwhile, in the work area S2, the components are assembled to the car body W held by the holding unit 2A on the transport rails 3. Moreover, the holding unit 2C on the return rails 4 is returned upstream. In other words, the holding unit 2C is transferred onto the first lift rails 5 in the carrying-in area S1 (see FIG. 6). The first lift rails 5 and the holding unit 2C are subsequently lowered and stopped at the carrying-in position (see FIG. 1).

The above process is repeated to sequentially assemble the components to the car body W carried in from the previous step. The car body W is then carried out to the next step.

As described above, in the overhead conveyor apparatus 1 according to the embodiment, the return rail 4 is provided above the transport rail 3. They are placed one over another in the vertical direction. Consequently, the overhead conveyor apparatus 1 can reduce a space in the horizontal direction (for example, the transport direction) as compared to the known overhead conveyor apparatus having the closed loop transport route in a horizontal plane.

Moreover, the common lift unit (the first lift unit; the first lift rails 5) performs the operation of raising the holding unit 2 holding the car body W up to the height of the transport rails 3 from the carrying-in position, and the operation of lowering the holding unit 2 down to the transport rails 3 from the return rails 4. In other words, the first lift rails 5 are provided upstream of the transport rails 3 to lower the holding unit 2 and transfer it from the return rails 4 onto the transport rails 3. Furthermore, the first lift rails 5 raise the car body W carried in from the previous step up to the transport rails 3. Consequently, the structure of the overhead conveyor apparatus 1 can be simplified.

Moreover, the common lift unit (the second lift unit; the second lift rails 6) performs the operation of lowering the holding unit 2 holding the car body W down to the carrying-out position from the height of the transport rails 3, and the operation of raising the holding unit 2 up to the return rails 4 from the transport rails 3. In other words, the second lift rails 6 are provided downstream of the transport rails 3 to raise the holding unit 2 and transfer it from the transport rails 3 onto the return rails 4. Furthermore, the second lift rails 6 lower the car body W from the transport rails 3 to be carried out to the next step. Consequently, the structure of the overhead conveyor apparatus 1 can be simplified.

An aspect of the present disclosure is not limited to the above embodiment. For example, in the above embodiment, the transport path and the return path are the transport rails 3 and the return rails 4, respectively. However, the transport path and the return path are not limited to the transport rails 3 and the return rails 4 as long as they can transport the holding unit 2 downstream or upstream. For example, the transport path and the return path may be a transport roller and a return roller.

Moreover, in the above embodiment, the first lift unit and the second lift unit are the first lift rails 5 and the second lift rails 6, respectively. The first lift unit and the second lift unit may instead be, for example, a roller that can ascend and descend together with the holding unit 2. Alternatively, an overhead conveyor apparatus according to an embodiment of the present disclosure may include a closed-loop shaped transport rail provided in a vertical plane. In this case, the holding unit 2 may be circulated on a route from the transport path →ascent →the return path →descent →the transport path along the transport rail.

Moreover, different lift units may perform the operation of raising the holding unit 2 up to the height of the transport rails 3 from the carrying-in position, and the operation of lowering the holding unit 2 down to the transport rails 3 from the return rails 4, respectively. Moreover, different lift units may perform the operation of lowering the holding unit 2 down to the carrying-out position from the height of the transport rails 3, and the operation of raising the holding unit 2 up to the return rails 4 from the transport rails 3, respectively.

Moreover, the overhead conveyor apparatus 1 according to the embodiment can be applied to the transport of not only the car body W but alto another work.

An aspect of the present disclosure is not limited to the above embodiment. It is needless to say that the technology of the present disclosure can be embodied as other various aspects within the scope that does not depart from the gist of the present disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An overhead conveyor apparatus comprising:
a holding unit configured to hold a work;
a transport rail configured to transport the holding unit holding the work downstream; and
a return rail provided above the transport rail and configured to return the empty holding unit upstream;
a first lift rail provided upstream of the transport rail and configured to lower the holding unit to transfer the holding unit from the return rail to the transport rail; and
a second lift rail provided downstream of the transport rail and configured to raise the holding unit to transfer the holding unit from the transport rail to the return rail, wherein
the first lift rail raises the work carried in from a previous step up to the transport rail, and
the second lift rail lowers the work from the transport rail to carry out the work to the next step.

2. The overhead conveyor apparatus according to claim 1, further comprising:
a frame body including a plurality of columns fixed to a floor surface and extending in a vertical direction, and a beam laid between the plurality of columns, wherein the transport rail and the return rail are fixed to the frame body.

3. The overhead conveyor apparatus according to claim 1, further comprising:
a carrying-in area into which the work is carried from a previous step;
a work area where components are assembled to the work; and
a carrying-out area from which the work is carried out to a next step, wherein
the first lift rail is provided in the carrying-in area, and is configured to ascend and descend between a height at which the work carried into the carrying-in area from the previous step is receivable, a height of the transport rail, and a height of the return rail.

4. The overhead conveyor apparatus according to claim 3, wherein the holding unit includes a pair of dollies, and each of the dollies includes:
a roller configured to roll along the transport rail and the return rail; and
a support arm supporting the work.

5. The overhead conveyor apparatus according to claim 4, wherein the support arm is movable between a protruding position where the support arm is able to support the work and a retracted position where the support arm is retracted to avoid interference with the work.

6. The overhead conveyor apparatus according to claim 1, further comprising:
a carrying-in area into which the work is carried from a previous step;
a work area where components are assembled to the work; and
a carrying-out area from which the work is carried out to a next step, wherein
the second lift rail is provided in the carrying-out area, and is configured to ascend and descend between a height at which the work is carried out to the next step, a height of the transport rail, and a height of the return rail.

* * * * *